(No Model.)
W. A. CRANDALL.
BED PAN.
No. 467,923.  Patented Feb. 2, 1892.
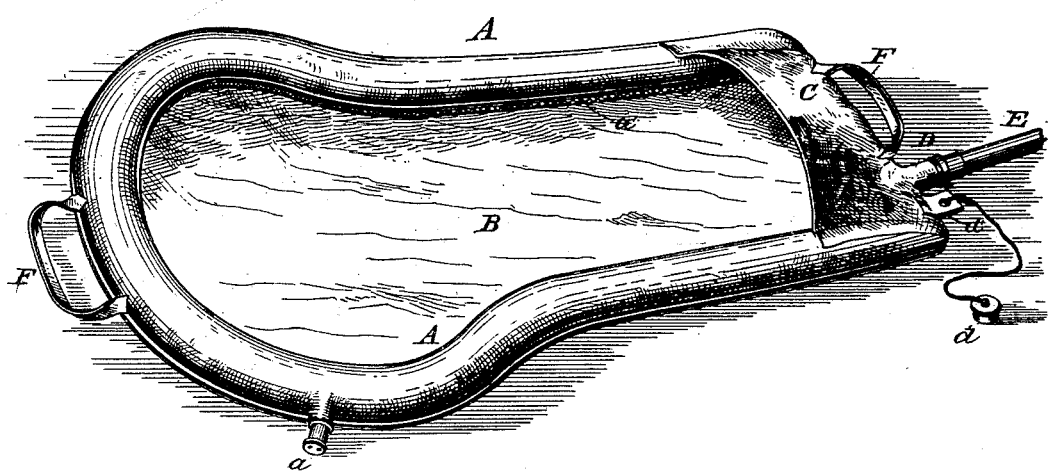
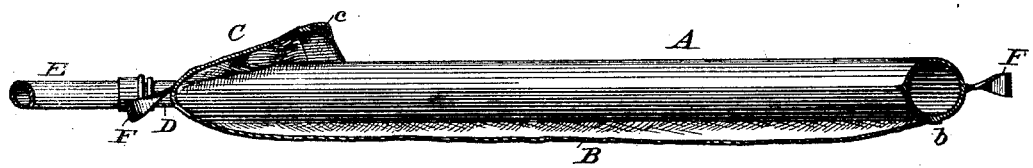
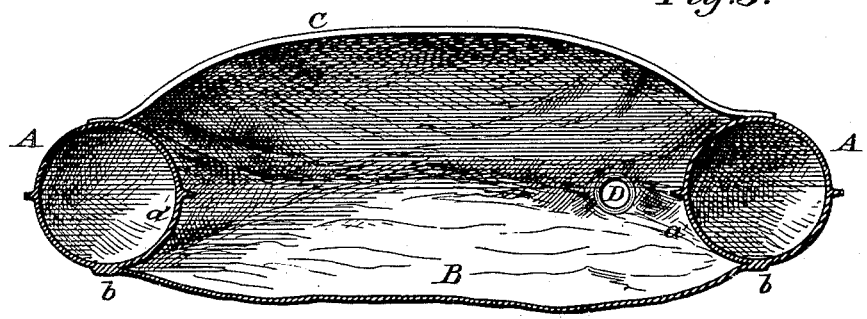
Witnesses  
Chas H Ourand  
D P Wolhaupter  
Inventor  
Willis A. Crandall,  
By his Attorneys,  
C A Snow & Co.

UNITED STATES PATENT OFFICE.

WILLIS A. CRANDALL, OF STURGIS, MICHIGAN.

BED-PAN.

SPECIFICATION forming part of Letters Patent No. 467,923, dated February 2, 1892.

Application filed May 9, 1891. Serial No. 392,149. (No model.)

*To all whom it may concern:*

Be it known that I, WILLIS A. CRANDALL, a citizen of the United States, residing at Sturgis, in the county of St. Joseph and State of Michigan, have invented a new and useful Bed-Pan, of which the following is a specification.

My invention relates to an improvement in flexible bed-pans; and it has for its object to provide a bed-pan that is particularly adapted as an obstetrical pan, to be used during confinement to prevent soiling the bed-clothing, and especially adapted to be used when the patient is receiving vaginal douches, and to provide a flexible pan that will be soft, easy, and non-irritating to any of the parts of the body with which it may come in contact, and at the same time be constructed of such material as will permit of ready cleansing of all parts; and it consists of a pan constructed entirely of a flexible material and having its parts combined in the manner hereinafter fully explained, illustrated in the accompanying drawings, and specifically pointed out in the appended claims.

In the accompanying drawings, Figure 1 is a perspective view of an obstetrical bed-pan constructed in accordance with my invention. Fig. 2 is a longitudinal section of the same. Fig. 3 is a cross-section looking toward the bag at the extremities of the rim.

Referring to the accompanying drawings by letter, A designates the rim of the pan, which is composed of rubber, preferably, or any other suitable flexible material. The said rim is hollow, to provide for inflation by a suitable medium, either air or water being used, which is admitted to the rim through the valved nipple $a$, by which the ingress, egress, and amount of liquid or gas are regulated. The rim is shaped to conform to the portion of the anatomy under which it is designed to be placed, being bulged out at one end of the pan and tapering down at its terminals to a reduced end, from which the matter is drawn off. To the under side of the rim and to the center thereof at $b$ is connected the bottom B of the pan, which is constructed of the same material as said rim, the connection of the same centrally to the bottom of the rim providing a dam to prevent the overflow of the liquid within the pan, the inflated rim of course forming a surrounding ledge $a'$ between its inner edge and said bottom connection.

The bottom B is lapped over the terminals of the rim at the reduced end of the pan and secured to the upper sides of the same to form a bag or receptacle C, of any size requisite or desired, into which the foreign matter is designed to flow and collect for removal. The said bag is bowed out and held normally open by means of a strengthening rib or steel $c$, secured in the edge of the bag. The bottom of said bag or receptacle is provided with an outlet-pipe D, which may be kept closed, when the pan is in use to allow the material to collect in the bag, by means of a cap or closure $d$, which may be conveniently attached to the bottom of the pan by means of a string connecting the same to a small perforated projection $d'$ on the pan; but a supplemental conducting-pipe E can be connected with said outlet-pipe to convey the matter collecting in the bag to any place that may be desired.

The pan is handled and adjusted in position by means of handles F at the top and bottom of the same.

From the foregoing the advantages and operation of this pan can be readily seen. The inflated rim acts as a cushion to the body and at the same time acts as a dam and conductor for directing the liquids from the vaginal or rectal operations into the bag at the bottom of the pan and thence through the outlet-pipe. The construction, shape, and combination especially adapts the same to obstetrical use or for any pelvic operations.

Having described my invention, what I claim, and desire to secure by Letters Patent, is—

1. In a flexible bed-pan, an inflatable rim, a flexible bottom centrally attached to the under side of said rim and forming a dam, and an integral bag or receptacle at the reduced end of said rim and bottom, substantially as set forth.

2. In a flexible bed-pan, an inflatable rim, a flexible bottom centrally attached to the inner side of said rim, and a bag or receptacle at the reduced end of said rim and bottom formed by lapping the bottom over the terminals of said rim and securing to the upper sides of the same, substantially as set forth.

3. In a flexible bed-pan, an inflatable rim contoured to form an enlargement at one end of the pan and reduced portion at the other, a flexible bottom centrally attached to the inner sides of said rim, and a bag or receptacle at the reduced end of the pan provided with a strengthening and shaping rib within its free edge, said bag or receptacle being formed by lapping the bottom over the terminals of said rim and securing to the upper sides of the same, substantially as set forth.

In testimony that I claim the foregoing as my own I have hereto affixed my signature in presence of two witnesses.

WILLIS A. CRANDALL.

Witnesses:
P. H. SMITH,
E. W. PENDLETON, Jr.